United States Patent
Volk et al.

(10) Patent No.: US 8,490,775 B2
(45) Date of Patent: Jul. 23, 2013

(54) MULTIPLEX GROUPING DEVICE

(75) Inventors: Rainer Volk, Holzkirchhausen (DE); André Uhl, Waldbrunn (DE); Carsten Krämer, Marktheidenfeld (DE)

(73) Assignee: Elau GmbH, Marktheidenfeld (DE)

( * ) Notice: Subject to any disclaimer, the term of this patent is extended or adjusted under 35 U.S.C. 154(b) by 331 days.

(21) Appl. No.: 12/743,305

(22) PCT Filed: Nov. 14, 2008

(86) PCT No.: PCT/DE2008/001885
§ 371 (c)(1),
(2), (4) Date: Sep. 13, 2010

(87) PCT Pub. No.: WO2009/062493
PCT Pub. Date: May 22, 2009

(65) Prior Publication Data
US 2011/0056798 A1    Mar. 10, 2011

(30) Foreign Application Priority Data
Nov. 17, 2007 (DE) .......................... 10 2007 054 956

(51) Int. Cl.
*B65G 47/80* (2006.01)
*B65G 37/00* (2006.01)

(52) U.S. Cl.
USPC ................... 198/419.3; 198/459.8; 198/460.1

(58) Field of Classification Search
USPC ........... 198/418.7, 419.2, 419.3, 459.8, 460.1
See application file for complete search history.

(56) References Cited

U.S. PATENT DOCUMENTS

| | | | | |
|---|---|---|---|---|
| 5,035,315 A * | 7/1991 | Fukusaki et al. | ........... | 198/419.2 |
| 5,038,915 A * | 8/1991 | Delsanto | .................... | 198/419.3 |
| 5,630,311 A * | 5/1997 | Flix | ................................ | 53/543 |
| 5,699,651 A * | 12/1997 | Miller et al. | .................... | 53/448 |
| 5,738,202 A * | 4/1998 | Ydoate et al. | .............. | 198/460.1 |
| 6,286,290 B1 | 9/2001 | Fluck | | |
| 6,540,063 B1 * | 4/2003 | Fallas et al. | ................ | 198/461.1 |
| 6,648,125 B1 * | 11/2003 | Bershadsky | ............... | 198/460.1 |
| 6,814,217 B2 * | 11/2004 | Blumenthal et al. | ........ | 198/459.8 |
| 7,168,552 B2 * | 1/2007 | Katayama | ................... | 198/460.1 |
| 7,500,550 B2 * | 3/2009 | Strong et al. | ............... | 198/347.1 |
| 7,681,712 B2 | 3/2010 | Hara et al. | | |
| 2009/0114508 A1 | 5/2009 | Hara et al. | | |

FOREIGN PATENT DOCUMENTS
WO    WO 2007/055112 A1    5/2007

* cited by examiner

*Primary Examiner* — Mark A Deuble
(74) *Attorney, Agent, or Firm* — Edwin D. Schindler

(57) ABSTRACT

A multiplex grouping apparatus for grouping sequentially fed articles includes at least one loading station with a feed sensor, at least one unloading station with a discharge sensor and at least two conveying devices. The conveying devices include a plurality of mechanically interconnected carriers and each conveying device can be moved by a respective controllable drive, which can be activated by a central control device using a respective speed controller. Articles can be transferred onto the carriers from each loading station and articles can be transferred from the carriers into each unloading station with each conveying device, during transfer of an article from the loading station to one of the carriers, moving synchronously with the feed sensor and, during transfer of an article into the unloading station, moving synchronously with the discharge sensor. Between transfer operations, the multiplex grouping apparatus accelerates and decelerates articles so that the spacing between two articles corresponds to a dimension predetermined by the grouping.

14 Claims, 1 Drawing Sheet

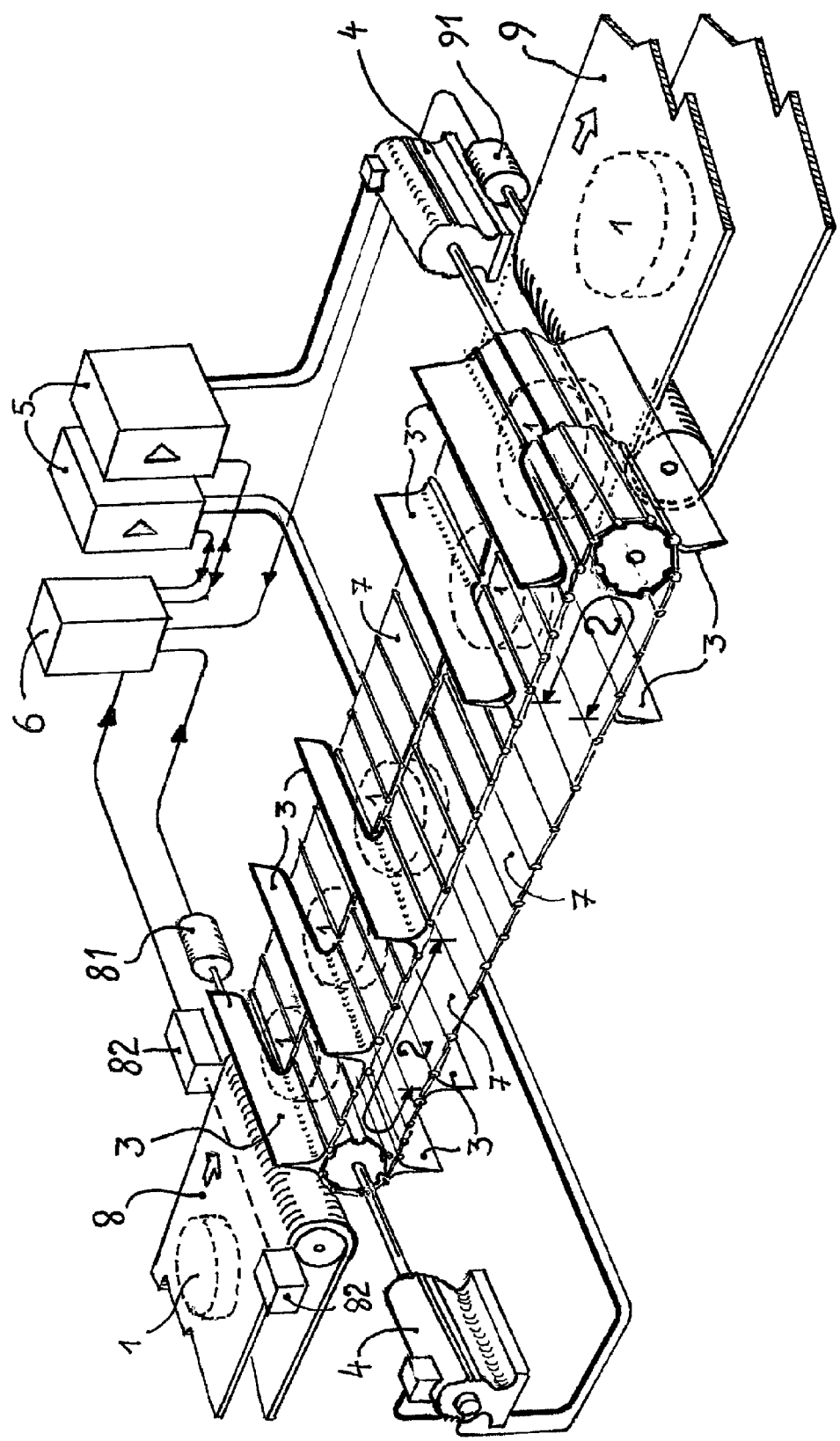

MULTIPLEX GROUPING DEVICE

BACKGROUND OF THE INVENTION

1. Technical Field of the Invention

Multiplex grouping device for grouping sequentially fed articles, comprising at least one loading station with a feed sensor, at least one unloading station with a discharge sensor and at least two conveying means, the conveying means comprising a plurality of mechanically interconnected carriers, and each conveying means being movable by a respective controllable drive, which can be activated by a central controller via a respective speed regulator and articles can be transferred onto the carriers from each loading station and articles can be transferred from the carriers into each unloading station

2. Description of the Prior Art

In the state of the art, a plurality of interconnected machines with in some cases complex movement sequences, such as packaging machines, can often only process the received articles at maximum speed if the articles are supplied at uniform spacings from one another or in groups with a particular spacing pattern.

Therefore such complex machines are arranged in so-called grouping stations, which adjust the required spacing or the required spacing pattern. The most widely used process is the series connection of a plurality of conveyor belts. The first belt acts as an accumulating belt by reducing its speed with respect to the incoming stream of articles such that all articles on the conveyor belt collide with one another, during which they are prevented from escaping at the sides by means of side-delimiting wall. On at least one connecting belt with high speed, the articles are drawn apart again, and are then all at the same spacing from one another.

During the transition from one belt to the next, the article temporarily comes into contact with both adjacent belts. However, since their velocity is different, the article slides on at least one of the belts. So that it is not damaged in this phase, the friction between the article and the belt must not be too high. On the other hand, the friction must not be so low that the article is no longer sufficiently accelerated and slowed by the belt. This results in the disadvantage that not every article can be combined with any arbitrary belt material.

Another restriction is that, depending on the geometry of the goods, which, because of the transition from one belt to the next cannot be sufficiently large, another belt must be interposed. The use of up to eleven so-called correction belts is known.

Another problem of this principle is that, where there is a relatively large gap in the stream of incoming articles, the braking effect of the accumulating belt is not sufficient to close the large gap, whereupon, during discharge of the articles, too, a spacing occurs that is greater than the actually required value.

Then the following machine executes a so-called idle stroke, e.g. a machine that packages articles in so-called "sausage bags," cuts an empty plastic section and forms it into a sausage bag, but without it containing any goods. If the next station is a shrink oven, in which the film is shrink by heating to the extent that it bears against the articles, a bag may completely melt down without the cooling of the goods contained in the bag, and be heated so intensively that it catches fire.

In this application example, an empty cycle has the effect that the entire production line must be stopped, the melted bag removed and the system started up again, which serious affects the average processing rate.

Other disadvantages of the prior art are the limited flexibility due to the geometrical conditions. The correction belts should be chosen in their dimensions such that they harmonize with the corresponding product sizes, for which purpose a multiplicity of belts must be interconnected for relatively large products. The space requirement is always high, since the belts are arranged in series and the length of each belt must be matched to the dimension of the smallest and largest product.

Other restrictions are that the correction belts must be matched to the characteristics of the following machines, if their velocity can only be changed within a very low percentage of the nominal value.

SUMMARY OF THE INVENTION

Against this background, it is the object of the invention to provide a universally applicable, compact multiplex grouping device, which transforms the streams of articles of widely diverse sizes and characteristics, which arrive at irregular intervals, into a stream of articles, which have uniform intervals from one another, or are subdivided into groups having in each case a uniform spacing within a group.

As a solution, the invention proposes a multiplex grouping device, in which each conveying means, during transfer of an article from the loading station onto a carrier, is moved synchronously with the feed detector, and during the unloading of an article into the unloading station moves synchronously with the discharge detector; and between the unloading processes is accelerated and delayed to the extent that the spacing between two articles corresponds to the dimension determined by the grouping.

The gist of the invention is that each conveying means, during loading, moves synchronously with the speed of the incoming articles, and then is switched to the unloading station as master for the velocity; it thus moves synchronously with the velocity of the unloading in an unloading station, such as a packaging machine, the pauses between two unloading processes being used to adjust the necessary spacing, the entire conveying means thus being delayed or accelerated briefly with respect to the synchronous velocity.

The instantaneous velocity of the conveying means during unloading thus always fluctuates in time with the unloading processes. However the long-term mean value of the velocity of incoming article stream is identical with the long-term mean values of the velocity of the articles within the multiplex grouping device according to the invention and the unloading station, since neither the grouping device nor the unloading station stores or buffers the articles.

It is therefore expedient to determine the entire mean velocity as a function of that machine, and to vary it only very slowly in ratio to the other machines, which are linked thereto, and only to allow it to change its velocity to a very small extent. Within the limits of this uniform mean velocity, the controller of the multiplex grouping device according to the invention then controls its individual strokes so that the following three criteria are fulfilled:

slip-free loading of the conveying means;
slip-free unloading of the conveying means; and
setting the required spacing pattern between the articles during unloading.

The decisive advantage of a multiplex grouping device according to the invention is thus that, during transfer from the loading station to the conveying means and during unloading from the conveying means into the unloading station, each article is free of friction during the slip processes, and can therefore be moved in the gentlest conceivable manner. To accelerate the loss-free and damage-free handling even of very insensitive articles, such as not-yet cured products or still unclosed containers with liquids, or to make it possible at all, each carrier takes each article along with it safely, and the risk of undesirable slipping of the articles is minimized.

So that each conveying means can access the entire width of the stream of goods, the width of its carrier extends beyond the entire width of the incoming stream of articles.

Each conveying means is moved from its own controllable drive with an associated speed controller, which receives its setpoint velocity value from a central controller. This controller evaluates the messages of the feed detector about the arrival of articles and from it, in dependence on the required spacings or spacing patterns of the articles in each case, forms the setpoint speed values for all drives.

A considerable difference of the multiplex grouping device of the invention from grouping devices of the prior art, with belts connected in series, is that the spacing for separation of the articles is no longer derived indirectly from the velocity difference of two adjacent belts, and results in the respective coefficients of static and dynamic friction of the articles on the belts, but is positively, and therefore precisely, determined under direct mechanical contact of the carrier with article.

A further advantageous difference is that, instead of up to eleven correction belts as before, a single assembly is sufficient. Within this assembly, the cycle of grouping takes place as follows: In the region of the loading station, a still unloaded conveying means is kept ready by the controller. The feed detector reports the velocity of the incoming articles to the controller, which thereupon accelerates the conveying means to the velocity of the incoming article, and traverses it through the loading station with the velocity. The incoming articles are pushed into the carriers of the conveying means. With this very simple process, however, the phase between the carrier and the arriving article is indeterminate.

However, when the carrier is shaped as a plate or as a segment of a profile segment that is oriented in the direction of movement, the phase may be unimportant. There are configurations in which it is not important at which point of the carrier in the movement direction the article is laid. For such cases, it is sufficient to register the velocity of the incoming articles.

Then, a feed detector that is mechanically connected to the loading station and is electrically read by the controller is sufficient. However, other types of velocity measurement are possible.

However, if the carrier of a conveying means is formed so that the articles must be placed, suspended or inserted in a particular range or even at a particular point, the carrier must take up a particular position, that is to say brought into a particular phase, with respect to the incoming article.

It is conceivable for stationary operating states in some circumstances to have the phase manually corrected by a human operator. If, however this could lead to undesirable damage of the article, an additional sensor must be installed, which registers each incoming article.

As soon as this sensor has reported the arrival of an article at the loading station to the controller, a free carrier of a conveying means is moved as close as possible to the loading station, and so accelerates as promptly as possible to the velocity of the incoming article such that when the article arrives it has also reached its velocity and position. By this means, the phase angle between the article and carrier can be matched to an optimum transition of the article into the carrier.

In this manner, all the desired carriers of a conveying means can be loaded with articles. It is also possible to conceive special cases, in which the carriers are differently loaded, that is to say, for example, that a carrier is doubly occupied, or not at all.

As soon as the loading is complete, the conveying means is disconnected from the feed detector as master for its velocity, and connected to the discharge detector of an unloading station as new master. The term "master" describes a detector that is registered and evaluated by the control, and is the source for the setpoint value that is modelled in the controller.

DETAILED DESCRIPTION OF THE PREFERRED EMBODIMENTS

During unloading, the simplest configuration of the unloading station is a stepless variant, in which the article can be unloaded to the unloading station at any arbitrary position. In this embodiment, at the unloading station, it is sufficient to register its velocity, for example, by means of a detector, which is mechanically connected to the unloading station and can be electrically evaluated by the controller. Because, from the point of view of the workflow, this detector is arranged with the removal of the grouped articles, in this text it is also designated the discharge detector for the sake of clarity.

A significant feature of the invention is that, with the actual unloading process, in which the article to be unloaded touches both the carrier and the unloading station, the velocity of the carrier and the unloading station is the same, so that the article can switch from the carrier into the unloading station without troublesome slipping and free of additional impacts.

Until the next article enters into that movement phase in which it is contacts both the carrier and the unloading station, there is no direct connection between the carrier and unloading station. In this time span, the object of grouping is performed, i.e., the velocity of the conveying means is temporarily increased or decreased by the controller, so that the articles arrive at the unloading station with the desired spacing.

Here, the spacing of the articles within the conveying means must be known in the controller, either via the design-determined form of the carrier of the conveying means or—in the case in which the profile of the carriers passes uniformly in one direction—by saving of the position of the articles during loading or by sensing the position of the articles on the carriers by means of a sensor.

The latter can be a light barrier, which permits very accurate recognition, or a camera system that can additionally also register the orientation of the articles. In principle, however, all the other known sensors, such as switch contacts, infrared sensors, proximity initiators or other suitable ones, provided that their accuracy is sufficient for the respective application.

Each article is thus accelerated or delayed by the controller, via the speed regulator and the drive, from the movement in which it is position-synchronized, until the desired spacing from the leading article has been achieved, taking into account the travel spacing that is still necessary for velocity compensation. Then the controller switches back to the synchronous velocity, which is necessary for optimum unloading.

In such a configuration, a grouping station according to the invention can bring the articles not only to the spacings required in each case, but also to a particular phase angle with respect to a following machine. A significant characteristic of the invention is that, during the unloading of a conveying means, the following machine is the master for the conveyor belt of the grouping station.

Because during loading of the conveying means, its master is the feed detector, it is necessary to change from one master to another. In an advantageous embodiment, the controller limits a possible velocity and acceleration change during changeover; that is to say it interpolates the transition.

For connecting all the carriers of a conveying means, an endless belt has proved suitable. In the simplest form, the endless belt is stretched over two deflection rollers, one of which is driven. The suspension of the two deflection rollers is sufficient as a support for the endless belt. If a further endless belt extends parallel to it, it can be co-supported on the supports of the first endless belt.

If the endless belts and the axes of the deflection rollers are horizontally arranged, then, in the simplest form, one half of the carrier on the endless belt points upwards and the other half downwards. The upwardly facing carriers hold the articles placed thereon by gravitation. If a deflection roller is arranged directly next to or above the unloading station, the articles arriving there fall, by virtue of the curvature of the deflection roller and by virtue of gravity, from the carriers on the endless belt into the unloading station. In this configuration, separate carriers can be dispensed with, but the endless belt itself is used as carrier.

However, if the endless belt runs perpendicularly, carriers are necessary that fix the articles. Depending on their form and construction, the endless belt can extend both vertically and horizontally.

In an embodiment of the carrier similar to a gondola or cable railway, the drive axes of the deflector rollers for the endless belt can also be arranged perpendicularly. In principle, a multiplex grouping device according to the invention can also be constructed as a cable railway, wherein it should only be noted that the sagging of the cable and a possible load-dependent or temperature-dependent lengthening of the cable can be transmitted to the controller via corresponding actual-value detectors in order to correct the position actual value in each case.

This problem is eased or eliminated in that each carrier is supported directly or indirectly on at least one rail, which runs in an endless loop between the loading station and unloading station. On this rail, the carriers then run in a similar way to the cars of a railway train on their rail. A circulating endless belt parallel to the rail then serves as drive.

If this elasticity is negligible in the scope of the desired accuracy, the position of all carriers can also be determined via the position of the endless belt.

It is alternatively conceivable to configure a multiplex grouping device according to the invention from railway trains, with one locomotive as drive and to configure the attached cars as carriers. In that case, all the conveying means run on the same rail, which connects the loading and unloading station to one another. Each locomotive must then report its current position to the controller via a detector. The controller evaluates the detectors in the loading and unloading station and, while taking into account the grouping necessary for the unloading station, forms the correct setpoint value for each of the locomotives. To this end, the lengths of the cars, that is to say the carriers, of the conveying means must be stored in the controller. If the conveying means contains various cars (carriers), not only its lengths but also the respective position of the car in the conveying means, must be stored in the controller.

A conveying means can either have the same spacings between all carriers or the spacings corresponding to a particular pattern, e.g., to the packaging scheme of a particular carton in a packaging machine behind the unloading station. The fixed spacing between adjacent carriers, which is adjusted thereto, must be reported to the controller and stored therein.

As a further additional option, the carriers can be connected to the endless belt by means of detachable connections, such as screws or pins, which are secured by means of detent lugs. Then, in dependency on the size of the article to be packaged and the chosen packaging, the number and spacing of the carriers can also be varied. In this variant, usually the endless belt will have a considerably larger number of fastening points than carriers are actually present and connected to the endless belt.

In this fastening point, a carrier can be detachably connected to the endless belt. This connection must be inherently torsionally rigid, both in the working plane and perpendicular thereto, so that the carrier is not unintentionally pivoted during the movement. In particular, with comparatively narrow endless belts, each connecting point of a carrier should be advantageously subdivided into two connecting elements spaced from one another, which are then hardly subjected to any torsion any longer.

By the term "endless belt" is here meant both conveyor belts on which the articles to be conveyed at least partly lie, as well as other embodiments, which are then no longer in direct contact with the article to be conveyed, but are only connected thereto via the carriers. The articles can slide along, for example, on the planar-designed endless belt, and are only pushed forward by the carrier. In this case the coefficient of friction of the surface of the endless belt should be as small as possible.

Possible embodiments of the endless belt are toothed belts, chains or ball cables, the carriers being connected to the endless belt via plates, bridges, rods or similar constructions.

An important feature of this or similar embodiments is the slip-free connection between the driver and the carrier moved thereby. A position actual-value detector on the motor is then sufficient to register the position of the individual articles by the controller.

If the endless belt is designed as a cable or flat belt, slip can occur between the drive and the articles moved thereby. With such embodiments, at least one additional detector is necessary on at least one carrier, which is registered by the controller and, via which, a difference between the position actual value reported by the detector on the drive and the actual position value is read in as a correction value.

The axes of the drives can be oriented horizontally or vertically. The orientation of the drive is adapted to the chosen form of the endless belts and the carriers.

The invention prefers a slip-free connection between the carrier and the drive because the detector can then be flange-mounted on the drive, which is evaluated by the controller and is required by the speed regulator as actual value detector.

As regards the mechanical configuration, it can be of advantage if at least one drive is installed together with a rotational speed regulator in a common housing.

The carrier can alternatively be designed as a compartment, a trough, a depression, a bucket or a shovel. It is advantageous that the coefficient of friction of the surface is only relevant during unloading and loading, however, during the movement, the article is mechanically fixed by the form of the carriers. If, however, the carrier is only a plate, the article must not slip thereon during the movement, since this fault is not detected by the controller.

The result would be a malfunction.

A multiplex grouping device according to the invention always has a controller, which forms velocity setpoint values for all available drives, specifically in dependence on the spacings specified for the grouping. To make it possible to enter these values, an interface of the control to other input media already available on the machine, such as a PC with keyboard and screen, can be used. Or the control unit is equipped with its own decentralized input unit for these spacings.

For this, it is conventional to use known apparatuses, such as numerical keyboards, thumb-wheel switches and keypads, either purely numerical or else alphanumerical, such as are conventional for PCs, or touch screens. An extension would be the display of setpoint and actual values on a simple LED display, up to a flat screen monitor.

As a further expedient embodiment, in a multiplex grouping device according to the invention, additional stations can be integrated, for which purpose all endless belts must be correspondingly lengthened. It is additionally conceivable to use an arbitrary processing station or turning station, or a further unloading station, or a further loading station. An object could thus be additionally, e.g., marked, size reduced, turned or ejected from the grouping station at an early stage. Or additional articles are also introduced into a carrier.

In this case, the stations can be designed very differently. For example, for a loading station, the design can be as conveyor belt, bucket chain, chain or wheel with carriers for articles, such as a slide, conveying screw, handling system, robot, catapult or chute.

In the application of a multiplex grouping device according to the invention, the controller transmits, in a limited period of time, the changed rotary speed setpoint values to the rotary speed regulation of the drive of at least one of the conveying means, the amount and duration of the speed change being measured such that the necessary spacing for the desired grouping of the articles is produced between two articles or between two groups of articles.

In this manner, e.g., a stream of articles that arrive at different, arbitrary spacings can be transformed into a stream of articles with in each case the same, preselectable spacings.

Alternatively, the result can also be a stream of groups of articles, the spacings within the group being the same in each case. The spacings within the group can be different from one another according to a preselected pattern.

It is also possible that particular, predefined carriers are not loaded. In another variant, an unloaded carrier is provided promptly for each newly incoming article.

To use a multiplex grouping device according to the invention, further articles can be additionally laid, in an additional loading station, on carriers that were previously still free, or in carriers that are already occupied.

It is also conceivable that at least one article can pass through one or more additional stations without any activity there.

For example, in emergency stations or for rapid emptying of a grouping station according to the invention, it is an advantageous additional function that an only partly grouped and/or processed group of articles is removed in the next reachable unloading station, and the further loading and/or processing of the articles provided in the normal cycle is omitted.

As collection protection between two adjacent groups of articles, it is helpful to stop the drive of an endless belt immediately when a group of articles moved by this drive threatens to collide with another group of articles, whose processing or loading is not yet completed.

If a plurality of conveying means must wait before a station, because another conveying means is located in this station and processing its carriers there, then it is expedient to switch all waiting conveying means to the detector of this station as master, and to move synchronously with the conveying means located in this station. In this case, a small safety spacing between the individual conveying means is expedient to compensate for control strokes. In this way, waiting conveying means can be used for buffering the stream of articles.

It is also possible to load a stationary carrier with more than one article and only move it further when the loading is complete. In this case, the loading can take place in a particular sequence. One application could be populating a carrier with chocolates always in the sequence marzipan, nut and nougat.

Further details and features of the invention are explained below in greater detail with reference to an example. This is not intended to restrict the invention, but only to explain it.

BRIEF DESCRIPTION OF THE DRAWING FIGURE

FIG. 1 shows, in schematic view, an oblique view of a multiplex grouping device comprising two conveying means in accordance with the present invention.

DETAILED DESCRIPTION OF THE DRAWING FIGURE

In detail, FIG. 1 shows two parallel endless belts 7, which in each case connect the carriers 3 of a conveying means 2. The two conveying means 2 each consist of an endless belt 7, which is tensioned over two deflection rollers in each case and is moved via a drive 4 in each case. Being formed as link chains, they directly carry the articles 1, which are here designed as flat cylinders like a cheese.

Each of the two drives 4 is connected to a rotary speed controller 5, specifically with a thickly drawn power cable, which provides the energy for supplying the drives 4. The rotary speed control loop is closed via detectors, which in this example are mechanically connected to the drive 4, specifically in that they are flange mounted at the side facing away from the drive shaft. The signals of the detector are transferred via a signal line to the rotary speed regulator 5, which in the drawing is drawn parallel to the power cable.

Each rotary speed regulator 5 obtains a position setpoint value from the controller 6, a control loop between the rotary speed regulators 5 and the controller 6 being closed in that the controller 6 not only transmits setpoint values via the drawn electrical connection but also, via the rotary speed regulator 5 as intermediate station, also obtains actual position values from the detectors on the drives 4.

In the state drawn in FIG. 1, the rear conveying means 2 is located next to the loading station 8. Of its total of five carriers 3, three each face upwards and are already loaded with an article 1. The other two carriers 3 of the front conveying means 3, in the illustrated state, are still on the underside and are still unloaded.

The second front conveying means 2, which is located in the vicinity of the unloading station 9, comprises, in total, only four carriers 3, of which two are already unloaded and already face downwards. The other two carriers still carry an article 1. Of these, one article 1 is currently in the state of transition from the carrier 3 to the unloading station 9; that is to say is still in contact with the carrier 3 at the rear and with the unloading station 9 at the front.

FIG. 1 clearly shows that, in the illustrated instant of transfer of an article from a conveying means 2 to the unloading station 9, the velocity of the conveying means 2 and the velocity of the unloading station 9 should be exactly the same.

Only then does the article 1 not slide on the surface of the unloading station 9, but contacts it precisely at the point that is necessary for the grouping.

In this state, the conveying means 2 and the unloading station 9 run completely synchronously. To permit the controller 6 to control this synchronous running, the discharge detector 91 is mechanically connected to the unloading station 9 and transmits the velocity of the unloading station 9 to the controller 6. The controller 6 also obtains the velocity actual value of the conveying means 2 via the detector on drive 4, with the rotary speed regulator 5 as intermediate station, and can control the synchronous running by comparison between the information from these two detectors.

In FIG. 1 it is also clear that the article 1 currently still in transition is forthwith supported only on the unloading station 9 and then the conveying means 2 is already no longer contacted. At this point, the next article 1 is still supported only on the endless belt 7, and thus still has no connection to the unloading station 9. Until the—in this example last—article of the conveying means 2 comes into contact with the unloading station 9, there is thus no direct connection between the conveying means 2 and the unloading station 9. In this time window, the conveying means 2 can be delayed or accelerated with respect to the synchronization velocity to delay or give priority to the arrival of an article 1 at the unloading station 9, and thereby change the spacing to the respective preceding article 1 and adjust it to the dimension necessary for the grouping.

In the example shown in FIG. 1, on the unloading station 9, the spacings between the articles 1 are greater than the spacing between the carriers 3 on the endless belt. In this example, the velocity of the conveying means 2 must thus be somewhat slowed in the "contact-free" time windows.

FIG. 1 not only demonstrates a simple synchronized running but also the more complicated angularly synchronized running. For this, it is necessary for the controller 6 to register the respective phase angle. This purpose is served by the sensor 82, which registers the arrival of an article 1 in the loading station 8. The sensor 82 is here designed as a light barrier, the light beam of which is represented by a broken line, and is reflected at the other side of the feeding belt in a reflector, and thereby returned to the transmitting/receiving unit. Furthermore, the electrical connection between the sensor 82 and the controller 6 is drawn in FIG. 1.

As an example of an article 1, a cylindrical disk, e.g., a cheese, is shown with broken lines. It is clear that, with the movement of the feeding conveyor belt, it forthwith reaches the sensor 82, in the illustrated example thus breaks the light barrier, whereupon a report is emitted to the controller 6, which then activates the responsible rotary speed regulator 5, so that a carrier 3 is set into movement and speeds up in the vicinity of the feed belt in order to receive the article 1 that has just arrived there. Due to the registration of the phase angle, the arrival of the carrier 3 in the loading station 8 can be adjusted such that the cheese neither drops onto the carrier nor is roughly pushed upwards, but is received by the carrier 3 jerk-free and free of excessive sliding movements.

In FIG. 1, three cheeses (shown with broken lines) are already loaded onto the endless belt 7 of the rear conveying means 2 and lie on three carriers 3. In the next two steps, articles 1 are laid on the two other carriers 3, which are still below the working surface 2; of these articles FIG. 1 shows one already on the loading station. FIG. 1 makes clear that the conveying means 2 in this operating state follows the detector 81, as master.

When all the carriers 3 of the rear conveying means 2 are occupied with an article 1, in the next step, by an increase or decrease of the rotary speed of the drive 4, the entire rear conveying means 2 can be brought into a desired spacing from the preceding articles 1 of the preceding conveying means 2, which have then already left the multiplex grouping device and are already in the unloading station.

FIG. 1 illustrates readily that the conveying means 2 for this step expediently follows the detector on the unloading station 9, the "discharge detector" 91, as master.

The present invention preferably includes a slip-free connection between the carrier and the drive, so that the detector can then be flange-mounted on the drive (i.e., the detector can be mounted on the detector flange on the drive), which is evaluated by the controller and is required by the speed regulator as the actual value detector.

FIG. 1 also makes clear that the front conveying means 2 must then already have moved all its carriers 3 onto the underside of the multiple grouping devices, since otherwise they would collide with the first carrier 3 of the other conveying means.

The conveying means 2 is then briefly located in a waiting position on the underside. From this waiting position, the unloaded conveying means 2 is filled again in the loading station 8 with articles 1 and then brought to the desired spacing from the preceding conveying means 2.

In FIG. 1, it is clear that the conveying means 2, in the lower waiting position, must again be switched to the feed detector 81 as master.

From the point of view of their mechanical construction, the two endless belts 7 and the carriers 3 are extremely simple in design in the illustrated example. The two endless belts 7 in each case cover half of the width of the carrier 3. Each carrier 3 projects via a paddle-like extension over the respective adjacent endless belt 7. Since the articles 1 from the one endless belt 7 project over the adjacent endless belt 7, and therefore, in the event of rotary speed differences between the two belts, must slide along the adjacent endless belt 7, the surface of the endless belts 7 must be very smooth, so that each carrier 3 can move an article 1 also with a velocity difference with respect to the adjacent belt. To avoid interlocking of the articles 1, the edges of the members should be slightly lowered with respect to the joint that is visible in the drawing.

List Of Reference Characters

1 Article
2 Conveying means comprising a plurality of carriers 3 connected mechanically to one another
3 Carrier for receiving an article 1
4 Drive for a conveying means
5 Rotary speed regulator, regulates a drive
6 Controller, determines the setpoint value of the rotary speed regulators 5
7 Endless belt, connects all carriers 3 of a conveying means 2 to a drive 4
8 Loading station for transferring an article 1 to a carrier 3
81 Feed detector, registers the velocity of the articles 1 in the loading station
82 Sensor, registers the arrival of an article 1 in the loading station 8
9 Unloading station for unloading a carrier
91 Discharge detector, registers the velocity of the unloading station 9

The invention claimed is:

1. A multiplex grouping apparatus for grouping sequentially fed articles, comprising:
a central controller;

a loading station having a feed drive for articles being fed at irregular intervals;

a registration sensor for each article arriving in said loading station, so that each said article is registered by said central controller via said registration sensor;

an unloading station with a discharge detector; and, a plurality of conveyors comprising a plurality of mechanically interconnected carriers with each conveyor of said plurality of conveyors being movable via a respective controllable drive activated by said central controller via a respective speed controller, the articles being transferrable onto said mechanically interconnected carriers from said loading station and the articles are transferable from mechanically interconnected carriers into said unloading station, each said conveyor during transfer of an article from said loading station onto one said mechanically interconnected carrier being synchronously movable with said feed drive and, during unloading of the article into said unloading station, each said conveyor is synchronously movable with said discharge detector, each said conveyor being accelerated or decelerated between loading and unloading processes of the articles for maintaining a spacing between two articles that corresponds to a size of the articles.

2. The multiplex grouping apparatus for grouping sequentially fed articles according to claim 1, wherein said feed drive is mechanically connected to said loading station and is capable of being electrically evaluated by said central controller.

3. The multiplex grouping apparatus for grouping sequentially fed articles according to claim 1, wherein said discharge detector is mechanically connected to said unloading station and is capable of being electrically evaluated by said central controller.

4. The multiplex grouping apparatus for grouping sequentially fed articles according to claim 1, wherein each said mechanically interconnected carrier, during loading, is movable in said loading station, angularly synchronized with a positioning of an article while the article contacts both said loading station and said mechanically interconnected carrier.

5. The multiplex grouping apparatus for grouping sequentially fed articles according to claim 1, wherein a transition of each said conveyor from synchronous movement with said feed drive to synchronous movement with said discharge detector via said central controller is continually interpolated for limiting a change in acceleration.

6. The multiplex grouping apparatus for grouping sequentially fed articles according to claim 1, wherein a transition of each said conveyor from synchronous movement with said discharge detector to synchronous movement with said feed drive via said central controller is continually interpolated for limiting a change in acceleration.

7. The multiplex grouping apparatus for grouping sequentially fed articles according to claim 1, further comprising an endless belt with each said mechanically interconnected carrier of each said conveyor being connected to said endless belt.

8. The multiplex grouping apparatus for grouping sequentially fed articles according to claim 7, wherein said endless belt is a toothed belt, a chain, a cable or a flat belt.

9. The multiplex grouping apparatus for grouping sequentially fed articles according to claim 7, wherein said endless belt and each said respective controllable drive has a slip-free connection therebetween.

10. The multiplex grouping apparatus for grouping sequentially fed articles according to claim 1, wherein at least one said respective controllable drive has a detector flange-mounted thereon that is capable of being evaluated by at least one said respective speed controller and said central controller.

11. The multiplex grouping apparatus for grouping sequentially fed articles according to claim 1, wherein said plurality of mechanically interconnected carriers have an equal spacing relative to one another.

12. The multiplex grouping apparatus for grouping sequentially fed articles according to claim 1, wherein at least one said respective controllable drive is installed together with at least one respective speed controller in a common housing.

13. The multiplex grouping apparatus for grouping sequentially fed articles according to claim 1, wherein each said controllable drive has an axis with axes of each said controllable drive being substantially horizontally oriented.

14. The multiplex grouping apparatus for grouping sequentially fed articles according to claim 1, wherein said plurality of mechanically interconnecting carriers is a trough, a bucket, a shovel or a plate.

* * * * *